Sept. 10, 1968 A. M. MORRIS 3,400,442
WORK ORIENTER
Filed July 25, 1966 3 Sheets-Sheet 2
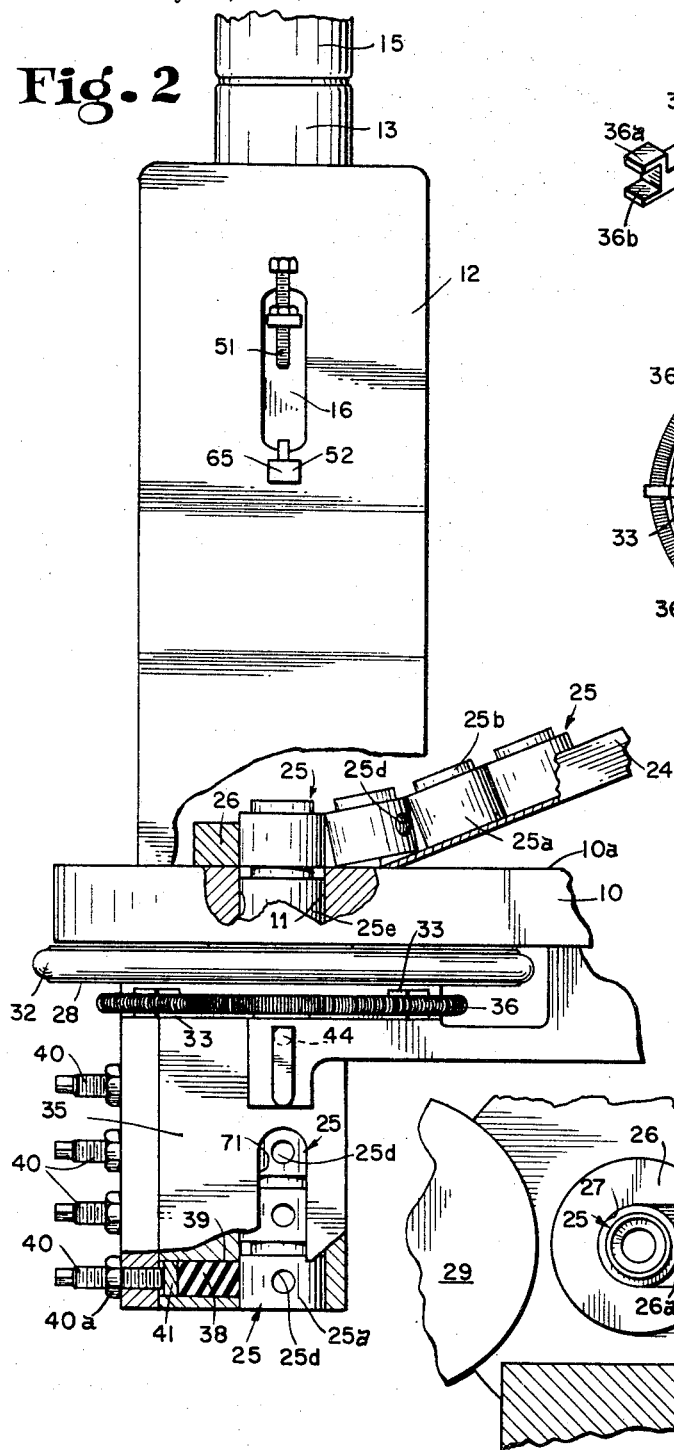
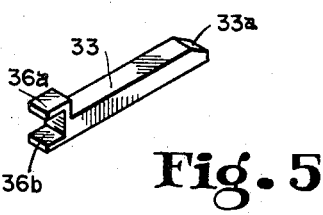
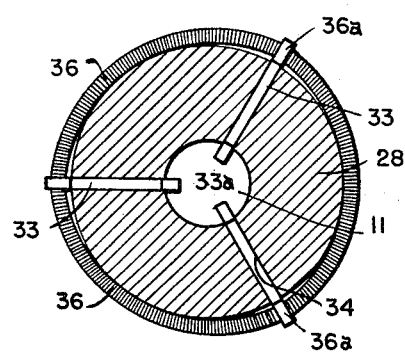
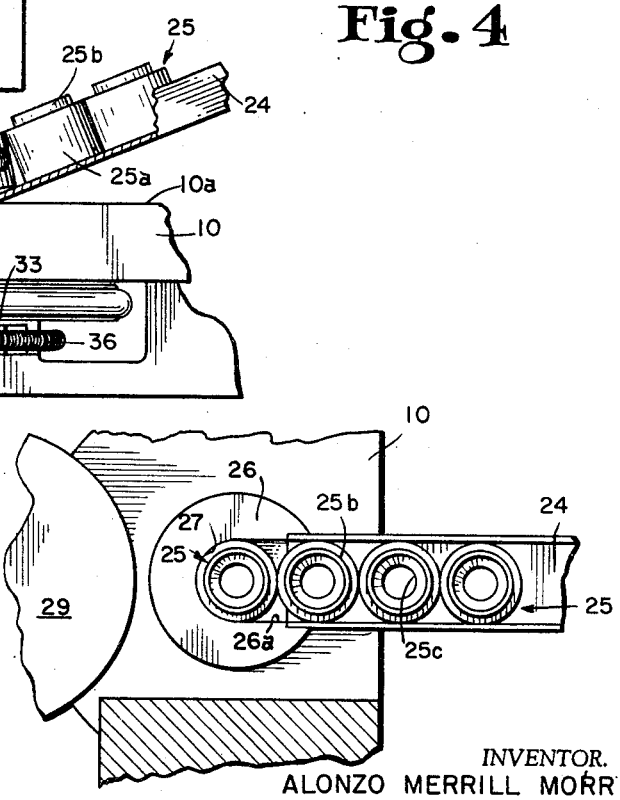
INVENTOR.
ALONZO MERRILL MORRIS
BY
Herbert P. Winburn
ATTORNEY

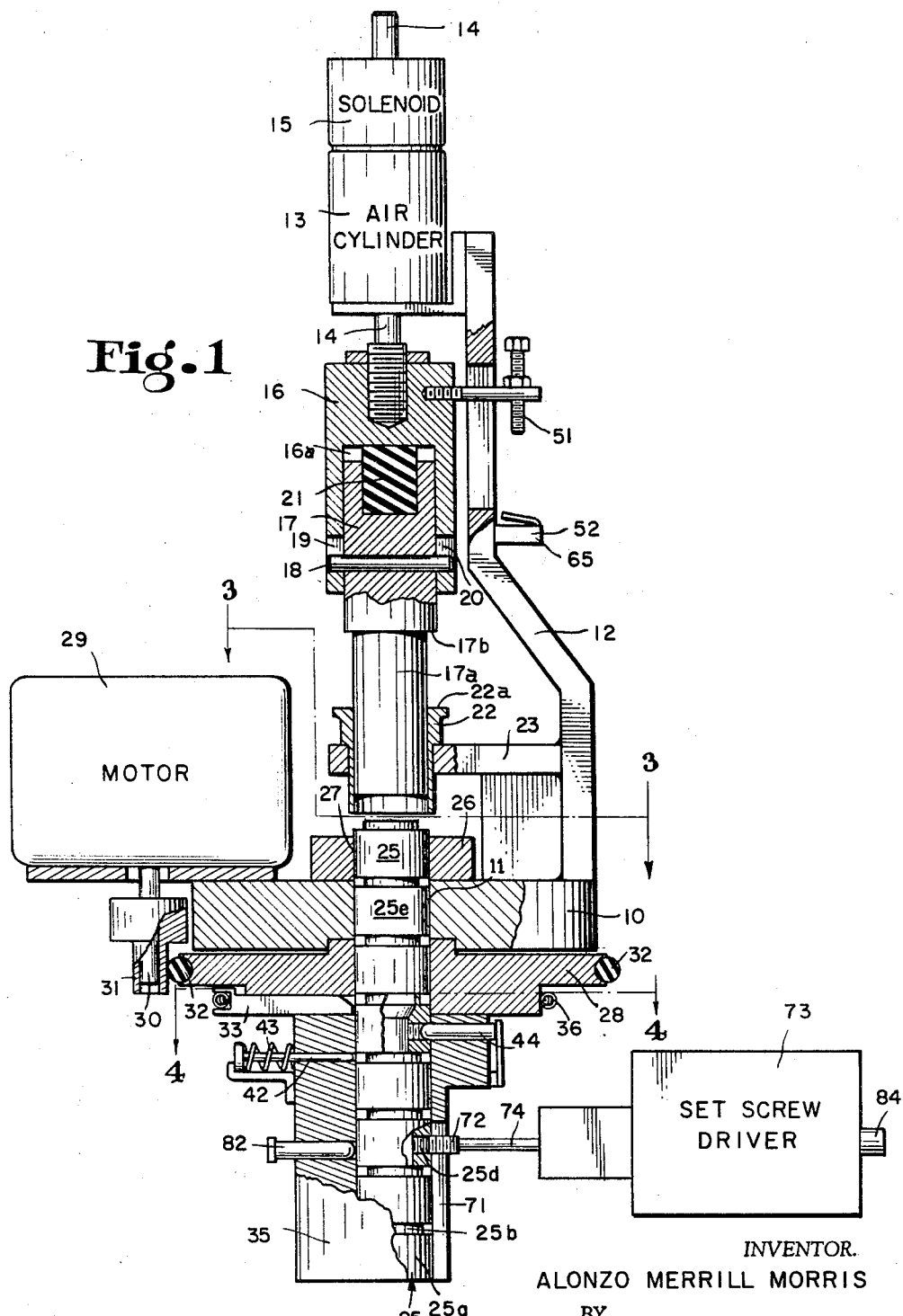

United States Patent Office 3,400,442
Patented Sept. 10, 1968

3,400,442
WORK ORIENTER
Alonzo Merrill Morris, Franklin, Ind., assignor to
Vernco Corporation, Columbus, Ind.
Filed July 25, 1966, Ser. No. 567,626
11 Claims. (Cl. 29—208)

This invention relates to a device for automatically orienting like work parts to present one after another with a common zone of each part at a predetermined position. The invention is not limited to one particular part design, but it is essential that all parts be approximately identical. Work of some kind is to be done in the zone presented. This work may be of wide selection. For example, the work may be that of grinding, drilling, welding, fitting of another part to the oriented part, and the like.

The particular form of achieving orientation forming the basis of the description of the invention herein, as one example is that of aligning of fan or blower wheel mounting and driving hubs to present in common zones a side of the hubs in which is a screw-threaded hole. The work to be performed in this example is that of entering a set screw in the hole to be available for securing the hub on a drive shaft in a subsequent hub and fan or wheel mounting on a shaft.

The hubs are fed to the orienting device with common ends upwardly directed, one on top of the other. The stacked hubs are lowered a predetermined distance in subsequent steps. One hub after another is gripped by dogs rotated and stopped to have the threaded holes in predetermined vertical alignment. An automatic screw presenting and driving machine puts a screw in each of the holes as the hubs are shifted to a particular station to align the holes one after another with a screw carrier and driver member. The screw feeding and driving machine does not per se enter into the invention. Since it is commercially obtainble, its detailed design is not illustrated or described herein. However, its operation must be synchronized with that of the hub orienting device, which synchronization is explained hereinafter. The hubs carrying their applied screws are discharged one after another as other hubs are shifted to the screw receiving station.

Primary objects of the invention are to eliminate practically all manual labor in the screw inserting operation and hence speed up that operation as well as to eliminate the human error by insuring that every hub coming from the orienting device carries a screw. Other objects involve the development of a simple structure not prone to get out of order; one that is simple in operating controls, and also has a low cost each of manufacture, maintenance and operation.

These and other objects and advantages of the invention will become apparent in the following description of the one form of the invention which is made in reference to the following drawings, in which FIG. 1 is a view in vertical, central cross-section of a device embodying the invention;

FIG. 2 is a view in side elevation and partial section of the device;

FIG. 3 is a view in transverse section on the line 3—3 in FIG. 1;

FIG. 4 is a view in transverse section on the line 4—4 in FIG. 1;

FIG. 5 is a view in perspective of a clutch dog; and

Figure 6:
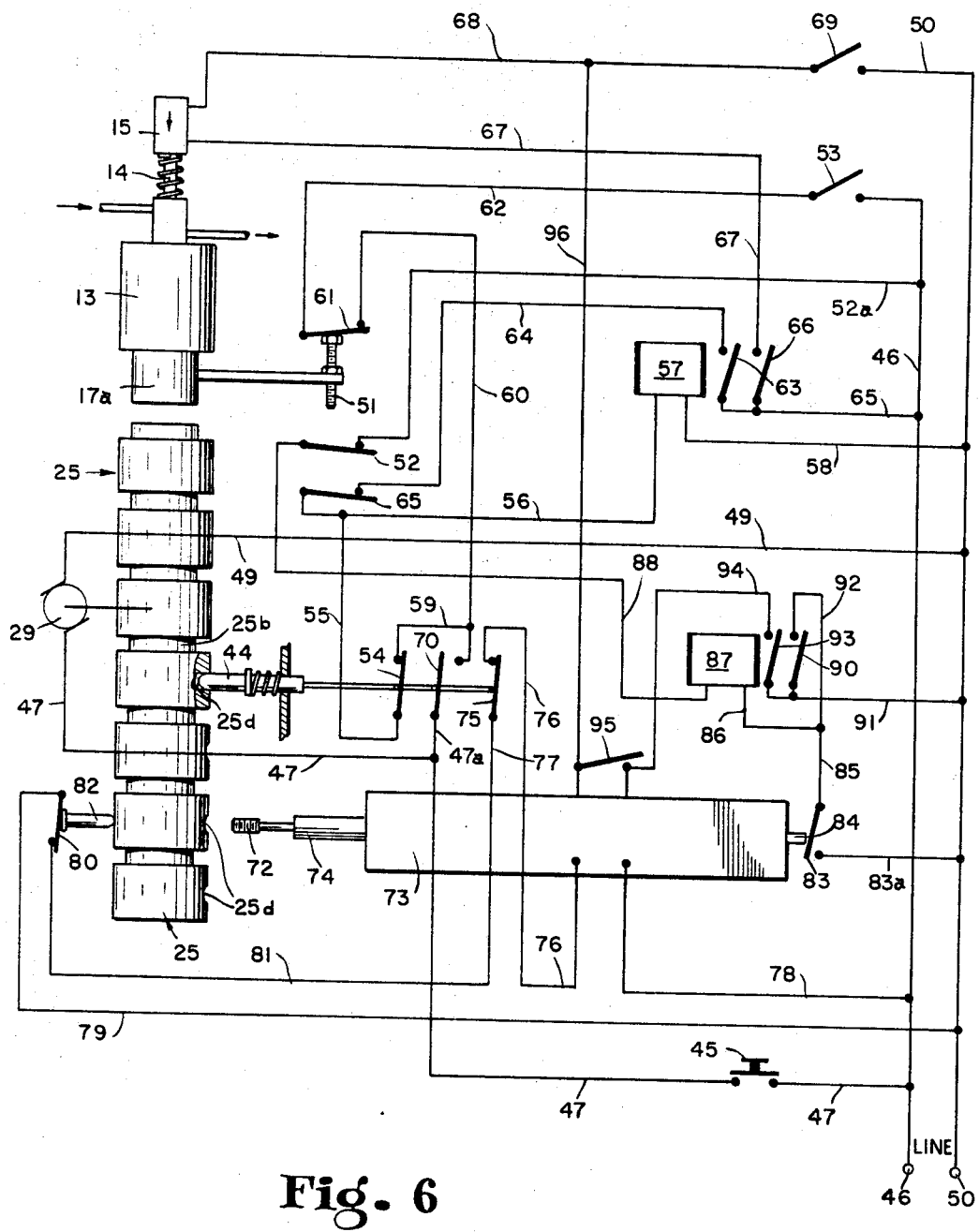
FIG. 6 is a schematic wiring diagram of the electric operating and control system.

A platform 10 fixedly mounted at any suitable location has a central bore 11 vertically extending therethrough. An arm 12 is fixed to the platform 10 at one side of the bore 11 and extends upwardly to carry an air cylinder 13 on its upper end portion and axially located above the bore 11. A shaft 14 passes through a solenoid magnet 15, through the cylinder 13, a piston therein (not shown) and to a head 16 below. The magnet controls an air supply and exhaust valve (not shown) in the usual manner for admittance and discharge of air to and from the cylinder 13. The head 16 receives slidingly in a bore 16a, the upper end of a plunger 17 in turn carrying a cross pin 18, the ends of which enter respectively diametrically opposite slots 19 and 20 in the lower end portion of the head 16 as means retaining the plunger 17 upper end portion within the head bore 16a with a degree of lost motion. The upper end of the plunger 17 carries an elastic block 21 normally retaining the pin 18 at the lower ends of the slots 19 and 20 and permitting a yielding travel of the plunger upperwardly. The lower end portion 17a of the plunger 17 slidingly fits within a guide collar 22 in turn carried by a support member 23 fixed to the arm 12.

A chute 24 slopes downwardly from a hopper (not shown) in which a plurality of parts 25 are held, and, under a vibratory action, are positioned to leave the hopper with like ends uniformly directed upwardly. The vibratory mechanism is commercially obtainable and hence requires no specific showing of its construction.

The parts 25 in the present instance each consists of a hub having a major cylindrical length 25a with a short coaxial minor length or collar 25b, a central bore 25c therethrough, and a transverse, threaded bore 25d entering from a side of the major length 25a and opening into the bore 25c. The collar 25b is on the upper end of the part 25. The chute 24 has a width just sufficient to allow the parts 25 to slide freely down it in single file to the surface 10a of the table 10 at the side of the table bore 11, FIGS. 2 and 3, there being sufficient slope to the chute 24 that, under the influence of gravity, a lowermost part 25 will be pushed to slide across a part 25e already in the bore 11, FIG. 1, or in the absence of the part 25e, the part 25 will drop down the bore 11 which has a diameter allowing the free dropping of the part without appreciable side travel in the bore.

This guiding of the parts 25 to the bore 11 is facilitated by the presence of a collar 26 fixed to the table 10 and having a bore 27 of the same diameter as that of the bore 11, with the bore 27 being in effect a continuation of the bore 11. The collar 26 has an opening 26a through one side of a width equal to the diameter of the bores 27 and 11. The chute 24 opens into the collar opening 26a, FIG. 3.

A table 28 is rotatably supported under the platform 10. Any suitable means may be employed to rotate the table on the axis of the bore 11, such as by gear means, particularly a worm gear drive, or, as herein shown by a friction drive wherein a motor 29 carried by the platform 10 has a vertical shaft 30 turning a pulley 31 in compressive contact with a resilient band 32 fitted around the periphery of a circular portion of the table, FIG. 1. A lower length of the table 28, FIGS. 1, 4 and 5, carries slidingly a plurality of jaws 33, herein shown as three in number, each in a radial slot 34, 120 degrees apart. The slots 34 each open into the bore 11 which extends continuously through the platform 10, the table 28, and a lower depending and fixed body 35. These jaws 33 are resiliently urged inwardly of their slots toward the bore 11 by any suitable means, herein shown in one particular form as by a continous coil spring 36 stretched around the outer ends of the jaws between vertically spaced fingers 36a and 36b, FIG. 5. The jaws 33 may be retracted from the bore 11 by the parts 25 being pushed down the bore 11 past the inwardly extending jaw ends. These ends are given a top slope 33a, FIG. 5, to facilitate this traveling therepast. The three jaws 33 will effectively grip the part 25, but permit pushing of it on down below the jaws.

The length of the bore 11 is made to accommodate parts 25 resting on one another therein from the top level of the platform 10 to these jaws 33 to have the upper end only of the major length 25a of a lower part 25 stop in the path of the jaws 33, FIG. 1. The length of the body 35 carries the bore 11 downwardly to hold three to four more parts 25 below the part gripped by the jaws 33.

Since the parts 25 may slide freely through the bore 11, means are provided to retain these three to four lower parts in the bore by frictionally engaging the parts under predetermined lateral pressure. Such means in the present form constitutes a block 38 of resilient material carried in a transverse bore 39, one each disposed approximately centrally of each part 25 stacked in the lower portion of the bore, FIG. 1, below that part 25 gripped by the jaws 33. A screw 40 screw-threadedly enters the body 35 at each bore 39 and bears against a pressure plate 41 in the bore 39, whereby rotation of the screw 40 may push the plate 41 against the block 38 to force it against the respective part 25. This desired pressure is maintained by a lock nut 41a on the screw 40 bearing against the body 35.

Operation

Assuming that the bore 11 is empty of parts 25, a hold pin 42 normally maintained in an outer position by means of a spring 43 urging the pin outwardly, is manually pushed inwardly of the body 35 on which it is mounted to place the inner end of the pin 42 within the bore 11 and is there held temporarily. This pin 42 initially holds that first part 25 in the bore 11 at a vertical position relative to a signal pin 44 location of which pin permits it to be horizontally slidingly carried by the body 35 to enter radially by its inner end or nose into the bore at a distance above the manual pin 42. This distance is that between the top of the pin 42 and the center of a hole 25d in a part 25 resting on the hold pin. This signal pin 44 is urged by a spring to bear on the part 25 and enter by its inner end ito the hole 25d when the part 25 has been rotated to align the hole 25d with the pin 44.

While the locator pin 42 is held in its inner position, three parts 25 are allowed to drop down the bore 11. The shaft 14 is manually pushed down to cause the plunger part 17a to seat those three parts 25 one upon the other, and make it certain that the initial part 25 has been pushed between the jaws 33 and come to rest on the hold pin 42. The shaft 14 is released and, being spring urged to its upper position, it will automatically return to its upper position when the plunger part 17a is returned to its upper position as shown in FIG. 1. The plunger 17a is limited in down travel by a shoulder 17b therearound striking the top 22a of the collar 22. The head 16 carries an adjustable finger 51 to have its lower end strike normally closed switches 52 and 65 fixedly carried by the arm 12.

The hold pin 42 is still held "in" and the starter switch 45 is closed. This switch 45 is of the push button two-point-make-type and is in series in a circuit from a line wire 46, wire 47, motor 29, wire 49 and the other line wire 50, FIG. 6.

The initial part 25, (the third part) being yieldingly gripped by the jaws 33 will be rotated by the turning of the motor 29 (up to one revolution of the table 28) at least until the hole 25d comes around to receive therein the nose of the signal pin 44, whereupon the switch 45 is released. This nose is rounded to have an approximately semi-spherical contour of a diameter slightly greater than that of the threaded-hole 25d. The pin 44 will releasably hold the parts 25 in the upper portion of the bore 11 and the hold pin 42 is then released to permit its retraction from under the third part 25. Further turning of the motor 29 if it occurs after seating of the pin 44 in the hole 25d does not rotate the part 25 since the spring loaded jaws 33 will then slip around the part 25 which is held stationary by the pin 44. The motor 29 in any event stops rotating the table 28 upon release of the switch 45. Upon the seating of the pin 44 in the part hole 25d, the apparatus is then ready for automatic cycling.

The pin 44, in dropping into the part hole 25d closes a switch 54 which is closed in series through the wires 55, 56, the winding of a relay 57, wire 58 and line wire 50, and the wires 59 and 60, a switch 61 closed by up travel of the plunger 17a, wire 62, switch 53 (normally closed) and line wire 46. A lock-in circuit is set up from the line wire 46, wire 65a, relay switch 63, wire 64 normally closed switch 65 opened by down travel of the finger 51, wire 56, relay winding 57, wire 58, and the line wire 50. This circuit prevents a false signal from the signal pin 44 when the parts 25 travel downwardly in the bore 11 to cause the reduced diameter of the part neck 25b to pass the signal pin 44 which moves less than the travel distance into a hole 25d inwardly into the channel set up by that neck 25b.

The energization of the relay 57 also closes the relay switch 66 which closes a circuit from the line wire 46, wire 67, solenoid winding 15, wire 68, switch 69 normally closed, and wire 50. This circuit energizes the solenoid 14 momentarily to cause the plunger 17a to push down another part 25 and lower the under column of parts 25 to move the undermost part 25 from the holding by the pin 44 and bring that part 25 down into frictional engagement with the uppermost pad 38 and there yieldingly retain it. As the plunger 17a is lowered, the finger 51 opens the switch 65 and thereby interrupts a circuit through the switch 63, wire 64, switch 65, wire 56, relay winding 57, and wire 58 thereby deenergizing the relay 57 winding and solenoid 15, allowing the plunger 17a to return under spring action back up and allow another aprt 25 to feed into the collar 26.

The locator pin 44 has been pushed outwardly from the hole 25d as the part 25 has descended. This pin action momentarily opens the switch 54 which promptly closes again upon the next above part 25 being rotated to its hole 25d oriented position in vertical alignment with the first pin-stopped hole 25d when the locator pin 44 drops by its nose into that next upper part hole 25d.

The motor 29 is energized when the pin 44 is forced out of that first part hole 25d and travels not only to open the switch 54 but to close a switch 70 which is in a circuit including that switch 70, the wire 60, switch 61, wire 62, switch 53, wire 46, and wire 47a, wires 47 and 48, the motor 29, wire 49, to wire 50. This is a momentarily closed circuit since the switch 70 opens upon the pin 44 dropping in the hole 25d of the next descending part 25. Then the operation so far described is repeated continuously as long as parts 25 are fed down the bore 11.

The switch 61 is included in the control circuitry to insure that the plunger 17a returns fully to its topmost travel limit even though the motor 29 makes but short spurts of travel when the holes 25d are relatively close to the desired vertical alignment.

When the part 25 comes to a rotation stop by the pin 44 engagement in the hole 25d, and the part 25 is pushed down to be frictionally engaged by a pad 38 to be beyond engagement by the jaws 33, the parts 25 no longer are subject to rotary travel, but one after another remain rotatively stationary one above the other with the holes 25d in alignment, with the holes 25d centered on a vertical line. These holes 25d, in the present structural design are displayed through a vertical slot 71 through the lower side portion of the body 35.

Common sides of the parts 25 are thus oriented, exposed and held for work to be done at those sides, following which the parts 25 are ejected from the lower end of the body 35 one after another by downward push of new parts one after another being pushed down the bore 11.

As one particular form of work to be done at these aligned part sides, a set screw 72 is automatically screw-threadedly inserted in each hole 25d. An automatic screw orienting and driving machine 73 is employed. Such a machine may be had in the open market and therefore is shown only in block form. This screw driving machine is electrically operated and does have to be synchronized with the part orienting operation in order that the correct timing of the entering of the screw into the hole 25d is set up. This machine 73 is placed adjacent the orienting machine to have a screw feeding and driving shaft 74 in horizontal axial alignment with the axis of the hole 25d in one of its located positions, FIG. 1, herein shown as being in the third from the lower-most part 25.

A circuit consisting of a switch 75, closed by travel of the pin 44 entering in a hole 25d and opened when removed from the hole, a wire 76, an operating device (not shown) within the screw driver 73, a wire 77, a wire 78 leading from the line wire 46 into the driver 73 to the above indicated device, a wire 79 leading from the line wire 50, a switch 80, and a wire 81 back to the switch 75, energizes the driver 73 only when a part 25 is present to receive a screw 72.

The switch 80 is normally closed by a pin 82 slidingly entering the body 35 to bear against that part 25, the hole 25d of which is in the position to be aligned with the shaft 74. Should there be no part 25 at that position then the pin 82 enters the bore 11 sufficiently farther to allow the switch 80 to open and thus interrupt that power supply to the driver 73.

The screw driver 73 has a feature built into it in that if a screw 72 would drop off the carrying and driving shaft 74, the driver 73 will recycle about three times to put another screw into the part. To accommodate this action, it is necessary for the part 25 orienting device to have a control detecting this driver situation whereby another part 25 will not be pushed down so as to cause a lower part to be ejected without a screw.

In this failure-detecting control, a switch 83 is supplied to be closed in response to normal travel under pressure by a ram 84 responding to the back pressure of the screw 72 upon entering the hole 25d. Failure of the screw 72 to be present on the end of the driver 74 will cause lack of that pressure and the ram 84 will not close the switch 83. In this situation the device 73, as above indicated, will re-cycle several times, and then stop.

When, in this re-cycling, a screw is inserted in a hole 25d, the synchronization of the screw driving and the positioning properly of the next part 25 ready to receive its screw is had by the screw setting operation setting up the required back pressure to push the ram 84 to close the switch 83. This switch 83 closes circuits energizing the solenoid winding 15 momentarily thereby causing the orienting device to perform in its normal manner of pushing down a part 25 for jaw 33 engagement and causing the motor 29 to rotate that engaged part to locate the screw hole to be aligned for a screw reception.

Now these synchronizing circuits are traced as follows, assuming that both switches 80 and 83 are closed.

The switch 83 controls a circuit from the line wire 50, through the wire 83a, switch 83, wire 85, wire 86, the winding of the relay 87, wire 88, switch 52, wire 52a, to the line wire 46. In closing this circuit, the relay switch 90 closes and completes a "lock-in" circuit from the wire 50, wire 91, through the switch 90, wire 92, wire 86, relay winding 87, wire 88, switch 52, wire 52a, to the line wire 46, thereby removing the switch 83 from the circuit when it opens.

Also the energization of the relay 87 closes a second switch 93 which closes a circuit from the line wire 50, through the wire 91, switch 93, wire 94, a trip switch 95 timed to be closed momentarily by return travel only of the screw driver shaft 74 following insertion in the hole 25d of a screw, wire 96, wire 68, solenoid winding 15, wire 67, switch 66 (then closed) of relay 57, wire 65, to line wire 46. The switch 69 is open when switch 53 is closed. When the plunger 17a is pushed down the switch 52 is opened, and the circuits are opened ready for the next cycle.

Thus it is seen that the parts orienting device may be operated alone simply as an orienting device. When it is required that work be done by automatically operating means at oriented zones of the parts, then the work device may as in the example set forth be synchronized to work automatically cyclically with the orienting device.

While I have herein shown and described my invention in one precise form, it is obvious that structural and electrical changes may be made without departing from the spirit of the invention, and I do not desire to be limited to that precise form beyond the limitations which may be imposed by the following claims.

I claim:

1. A device for consecutively orienting like work parts, each having a recess in a common zone, comprising
    a relatively fixed member having a bore therethrough;
    feeding means carrying work parts to said bore;
    a reciprocating plunger urging one part upon another through said bore;
    clutch means having elements directed into said bore engaging said parts therein, one at a time;
    means rotating said clutch in turn rotating an engaged part;
    said recess being in said part zone;
    a stop pin yieldingly directed into said bore into the path of that recess in the part engaged and rotated;
    the entrance of said stop pin into said recess stopping rotation of the part; and
    means intermittently reciprocating said plunger in timed sequence following said part rotation stopping.

2. The structure of claim 1, in which
    said bore continues from said clutch means;
    said parts being carried into and through said continuing bore and discharged therefrom by said plunger intermittent reciprocation; and
    means yieldingly retaining advanced parts in said continuing bore whereby a single part is discharged from the bore upon each plunger reciprocation.

3. The structure of claim 2, in which
    said continuing bore has an opening through which access may be had to said part zone.

4. The structure of claim 2, in which
    said bore is vertically disposed and has a diameter allowing said parts to drop therein under influence of gravity;
    the parts in the bore below said stop pin being supported by said yielding retaining means; and
    said parts recesses are vertically aligned upon dropping from said stop pin.

5. The structure of claim 4, in which
    said stop pin has a nose end entering said recesses which is retractible therefrom by pressure of said plunger on the parts above the part engaged by said stop pin; and
    said clutch elements have ends entering the bore to be retractible therefrom by the next-above part pressing downwardly on the bore-entered ends of those elements in order to engage that next-above part.

6. The structure of claim 2, in which there is
    an initial part locating pin entering said bore spaced from said stop pin to hold an initial part traversing the bore at a position to receive said stop pin in said recess; and
    said locating pin being normally biased outwardly from bore entrance.

7. The structure of claim 3, in which there is a signal pin biased to enter said bore opposite said access opening upon the absence of a part at that opening.

8. The structure of claim 4, in which said parts have a lateral screw-threaded hole, the entrance to which constitutes said recess and there is a screw driving device entering and turning a screw in said hole through said hole access opening into said part screw-threaded holes.

9. The structure of claim 5, in which said device is electrically operated in repetitive cycles, one cycle being effected by
   a circuit initially closed and including a power source and a solenoid instituting a plunger travel, and opened by predetermined travel thereof;
   a motor operating said clutch means;
   switching means operated by travel of said stop pin in and out of said recess; and
   a circuit including a switch in said switching means open when the stop pin is out of said recess, a power source and said motor.

10. The structure of claim 9, in which there is
    an additional circuit insuring a full plunger return travel before starting of said motor, including said switch, a relay winding, a source of power, a plunger return closed only when the plunger is fully returned, a relay switch, a motor switch closed by said stop pin when retracted from said recess.

11. The structure of claim 10, in which there is a relay hold circuit preventing a false signal when said stop pin travels less than the depth of said recess, said hold circuit including
    a plunger switch open only when the plunger has reached its said predetermined travel, a source of power, and a second relay switch.

References Cited

UNITED STATES PATENTS

| | | | |
|---|---|---|---|
| 2,681,668 | 6/1954 | Lubbert | 144—32 |
| 2,795,842 | 6/1957 | Van Nest et al. | 29—211 |
| 2,968,809 | 1/1961 | Foreman et al. | 29—203 |
| 3,093,894 | 6/1963 | Jurecka | 29—240 X |
| 3,165,139 | 1/1965 | Whitney | 29—208 X |
| 3,208,133 | 9/1965 | Morton | 29—208 |
| 3,345,729 | 10/1967 | Law | 29—211 |

THOMAS H. EAGER, *Primary Examiner.*